(12) United States Patent
Zhu et al.

(10) Patent No.: US 9,241,327 B2
(45) Date of Patent: Jan. 19, 2016

(54) LTE ENHANCEMENTS FOR SMALL PACKET TRANSMISSIONS

(75) Inventors: Yuan Zhu, Beijing (CN); Qinghua Li, San Ramon, CA (US); Yi Qin, Beijing (CN); Jong-Kae Fwu, Sunnyvale, CA (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 13/529,895

(22) Filed: Jun. 21, 2012

(65) Prior Publication Data

US 2013/0188566 A1 Jul. 25, 2013

Related U.S. Application Data

(60) Provisional application No. 61/639,795, filed on Apr. 27, 2012, provisional application No. 61/589,774, filed on Jan. 23, 2012.

(51) Int. Cl.
*H04W 4/00* (2009.01)
*H04W 72/04* (2009.01)
*H04L 5/00* (2006.01)

(52) U.S. Cl.
CPC ............ *H04W 72/042* (2013.01); *H04L 5/0037* (2013.01); *H04L 5/0094* (2013.01); *H04L 5/0053* (2013.01)

(58) Field of Classification Search
USPC ......... 370/229, 230, 235, 236, 251, 328, 329, 370/330, 436, 468, 474
See application file for complete search history.

(56) References Cited

U.S. PATENT DOCUMENTS

| 2007/0286066 A1 | 12/2007 | Zhang et al. |
| 2010/0054358 A1* | 3/2010 | Ko et al. ................. 375/267 |

(Continued)

FOREIGN PATENT DOCUMENTS

| KR | 102008003977 A | 5/2008 |
| WO | WO-2011054502 A1 | 5/2011 |
| WO | WO-2013112482 A1 | 8/2013 |

OTHER PUBLICATIONS

"Evolved Universal Terrestrial Radio Access (E-UTRA); Physical layer procedures", 3GPP TS 36.213 V10.4.0 (Dec. 2011) (Release 10). Technical Specification Group Radio Access Network., (Dec. 2011), 125 pgs.

(Continued)

*Primary Examiner* — Kwang B Yao
*Assistant Examiner* — Nguyen Ngo
(74) *Attorney, Agent, or Firm* — Schwegman Lundberg & Woessner, P.A.

(57) ABSTRACT

Disclosed in some examples is a method of wireless resource block assignment in a long term evolution wireless network including creating a downlink control information message for a user equipment, the downlink control information message comprising: a resource block assignment field which indicates up to N physical resource blocks scheduled to the user equipment by specifying an index into a plurality of all possible physical resource block allocations of between 1 and N resource blocks, wherein the resource block assignment field comprises at most a number of bits necessary to address all of the possible physical resource block allocations for assignments of 1 to N physical resource blocks, and wherein N is less than a total number of physical resource blocks; and sending the downlink control information over a physical downlink control channel using orthogonal frequency division multiplexing.

20 Claims, 7 Drawing Sheets

(56) References Cited

U.S. PATENT DOCUMENTS

| | | |
|---|---|---|
| 2010/0062782 A1 | 3/2010 | Higuchi et al. |
| 2010/0138541 A1 | 6/2010 | Zhu et al. |
| 2011/0085508 A1* | 4/2011 | Wengerter et al. ............ 370/329 |
| 2011/0103324 A1* | 5/2011 | Nam et al. ................... 370/329 |
| 2011/0110444 A1* | 5/2011 | Roh et al. ..................... 375/260 |
| 2011/0255485 A1* | 10/2011 | Chen et al. ................... 370/329 |
| 2011/0287798 A1* | 11/2011 | Ono et al. ..................... 455/509 |
| 2012/0275413 A1* | 11/2012 | Hong et al. ................... 370/329 |
| 2013/0128852 A1* | 5/2013 | Xue et al. ..................... 370/329 |
| 2013/0208645 A1* | 8/2013 | Feng et al. ................... 370/312 |
| 2013/0258986 A1* | 10/2013 | Seo et al. ..................... 370/329 |

OTHER PUBLICATIONS

"International Application Serial No. PCT/US2013/022580, International Search Report mailed Jun. 2, 2013", 4 pgs.

"International Application Serial No. PCT/US2013/022580, Written Opinion mailed Jun. 2, 2013", 6 pgs.

"UE-RS Multiplexing for Multple CCEs", 3GPP TSG RAN WG1 Meeting #68. R1-120610. Intel Corporation., (Feb. 6, 2012), 3 pgs.

* cited by examiner

LTE ENHANCEMENTS FOR SMALL PACKET TRANSMISSIONS

PRIORITY CLAIM

This application claims priority to U.S. Provisional Patent Application Ser. No. 61/639,795, filed on Apr. 27, 2012 and to U.S. Provisional Patent Application Ser. No. 61/589,774 filed on Jan. 23rd, 2012, both of which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

BACKGROUND

Fourth generation wireless technologies based on the Long Term Evolution (LTE) family of wireless standards promulgated by the Third Generation Partnership Project (3GPP) are largely designed for data services. While data services are gaining in importance to users of wireless technologies, voice services are still important. However, because LTE and other fourth generation wireless technologies are geared primarily towards fast data transmissions, the transmission of voice presents many challenges.

BRIEF DESCRIPTION OF THE DRAWINGS

In the drawings, which are not necessarily drawn to scale, like numerals may describe similar components in different views Like numerals having different letter suffixes may represent different instances of similar components. The drawings illustrate generally, by way of example, but not by way of limitation, various embodiments discussed in the present document.

DETAILED DESCRIPTION

Figure 1:
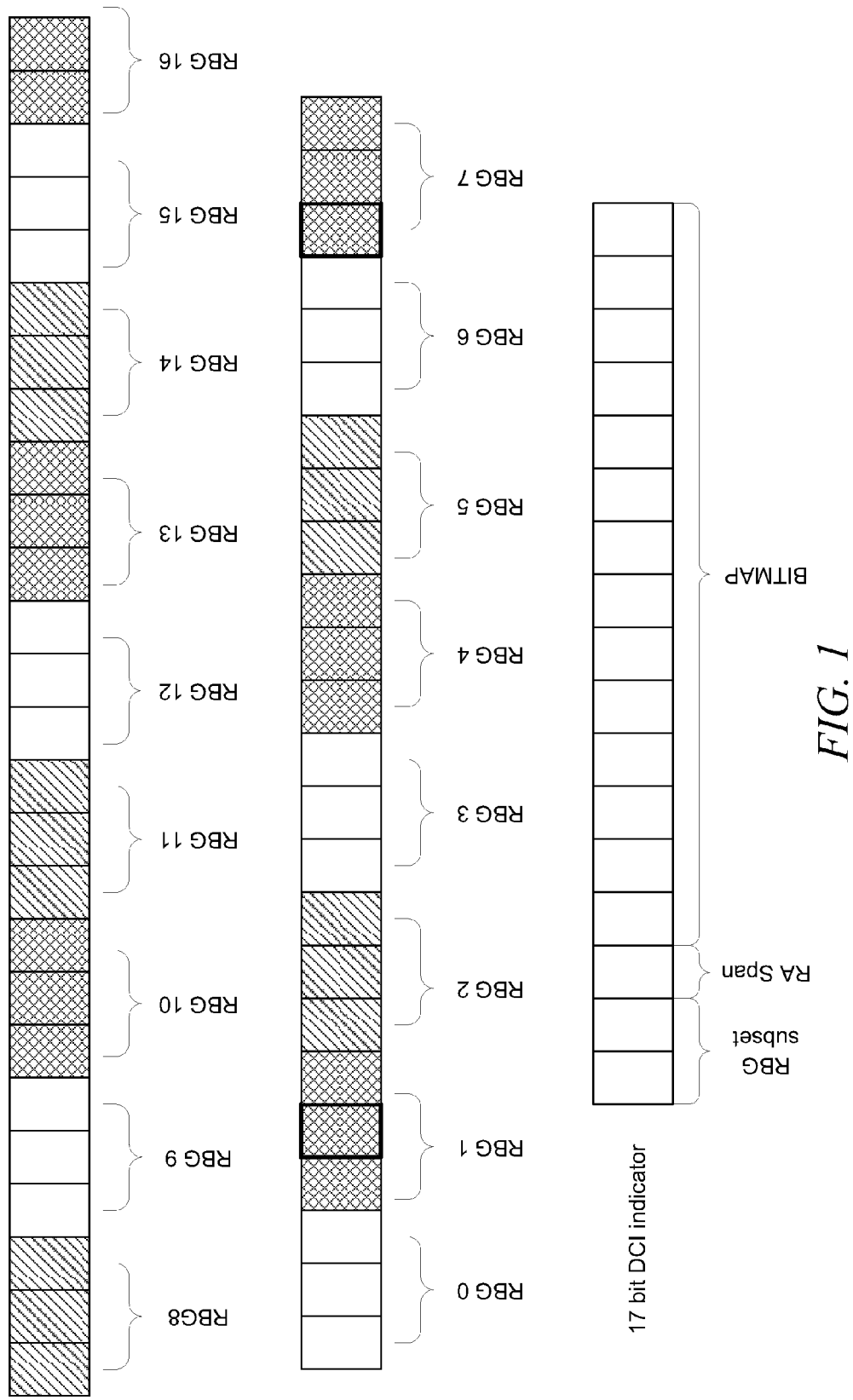
FIG. 1 shows a schematic of a resource allocation of type 1 according to some examples of the present disclosure.

In order to optimize LTE systems for data, the 3GPP designed LTE with no dedicated voice channels on which to send voice data. Rather, the air interface is one big shared resource. The downlink data channel is the Physical Downlink Shared Channel (PDSCH) and the uplink data channel is the Physical Uplink Shared Channel (PUSCH). As these resources are shared amongst all mobile devices (e.g., User Equipment or "UE"), a UE must be scheduled on particular resources of the channel each and every time there is data to send either downlink (toward the UE) or uplink (toward the base station—the "eNodeB"). In the case of the PDSCH, the entity on the eNodeB responsible for scheduling transmissions from the eNodeB (commonly referred to as the "scheduler") must send a scheduling message to the UE indicating which physical resources (e.g., which physical resource blocks "PRBS" in particular resource block groups "RBGS") are for that particular UE. In the uplink, the UE must send a scheduling request or a buffer status report to the eNodeB, which may then send a scheduling grant message to the UE granting it resources on the PUSCH. The scheduling messages are typically broadcast on a Physical Downlink Control Channel (PDCCH) which is typically located in the first few Orthogonal Frequency Division Modulation (OFDM) symbols of a resource block across the entire frequency of the resource block.

In the case of services which utilize packets which are of a fixed, small size, such as voice over IP (VoIP), which are sent on a relatively regular basis this mechanism leads to inefficient spectrum utilization as there needs to be control signaling to support each packet sent and/or received. The control overhead thus is substantial compared with the size of these packets. This leads to inefficient utilization of the wireless spectrum. This becomes a problem as more wireless carriers are looking to offer voice services over LTE networks.

The LTE air interface has recently seen several major features added which optimize the system somewhat for VoIP and other services. For example, semi-persistent scheduling cuts down on the necessary messaging as a UE may be preallocated certain resources on either the PDSCH or PUSCH for a particular amount of time. Additionally, LTE-Advanced (LTE-A) Releases 10 and 11 have introduced transmission mode 9 (which relies upon UE specific Reference Signals and Channel State Information Reference Signals—CSI-RS) to support closed-loop single user MIMO with up to 8 downlink spatial streams along with enhanced PDCCH (e-PDCCH). These features improve data throughput. E-PDCCH was introduced in LTE-A release 11. One major difference over legacy PDCCH, is that the legacy PDCCH was time multiplexed with the PDSCH in a PRB, however the e-PDCCH may be frequency multiplexed with the PDSCH to allow for more flexible and efficient scheduling.

These fundamental changes better enable services such as VoIP using the shared channels of LTE. Despite this, the air interface can still be improved further by utilizing the characteristics of the VoIP packets to avoid wasted signaling bandwidth on the PDCCH. That is, the characteristics of the packets sent by services such as VoIP may be leveraged to improve control signaling.

Disclosed in some examples is an improved allocation signaling defined for small packets of relatively fixed size. In some examples, this may be a small scheduling assignment message sent over the PDCCH to schedule a UE on the PDSCH. In some examples, this may be done by compacting the information in the scheduling assignment used to indicate the physical resources and other parameters that the UE is assigned (e.g., the downlink control information field "DCI"). For example, the resource block assignment field of the resource allocation "RA" field (e.g., the field used to specify the PRB and/or RBGs assigned to a UE) of the DCI may be shortened significantly from 17 bits to 2-3 bits in some examples (depending on the implementation and the network configuration). In other examples, other fields may be significantly shortened or eliminated in the small scheduling assignment message in addition, or distinct from examples shortening the RA field.

In the examples described herein we are assuming a 10 Mhz system using UERS and CSI-RS based transmission mode 9, but one skilled in the art with the benefit of Applicants' disclosure will appreciate that the solution may be used with other transmission modes and systems utilizing other bandwidths.

Resource Block Assignment

In LTE, downlink resources destined for a particular UE are signaled to the UE in a scheduling assignment message which contains a DCI field. The DCI field specifies certain characteristics of the downlink channel information of the downlink resources assigned to the mobile on the PDSCH. For example, the DCI field includes a resource allocation field which contains a header and a resource block assignment field which specifies the exact PRBs or RBGs that the UE is assigned on the PDSCH. The format of the DCI message may change depending on the transmission modes used. For transmission mode 9, the DCI format is DCI 2C.

For a system with 10 MHZ bandwidth and using DCI 2C, the resource allocation requires an 18 bit field comprising a 17-bit resource block assignment bitmap and a 1 bit resource allocation header. The resource allocation header switches between different resource allocation types—and in the case of DCI 2C, two RA types are defined: RA type 0 and RA type 1. The interpretation of the 17 bit bitmap various depending on which RA type is selected.

For RA type 0, the 17 bits of the resource block assignment comprise a bitmap which is used to allocate physical resource blocks (PRBs) to a UE based on grouping the PRBs into resource block groups comprising two or more consecutive PRBs. The bitmap specifies which of the RBGs are allocated to the mobile. Thus in an example where there are 50 resource blocks, each RBG consists of three consecutive PRBs (except the last RBG which consists of two consecutive PRBs), each of the 17 bits of the bitmap would indicate an allocation of a particular RBG. Notice that the granularity of this approach is limited to the size of a RBG—that is, three consecutive resource blocks. For services with a fixed, small packet size, such as VoIP, the spectrum efficiency is determined solely by the number of PRBs allocated for the VoIP packet. Each VoIP packet has 328 payload bits and 24 CRC bits for a total of 352 bits. If we assume that one PRB has only 12 resource elements devoted to UERS, we have a total of 156 resource elements that can be used to transmit the VoIP packet (because one PRB pair contains 2 slots and each slot contains 7/6 OFDM symbols—thus 7*2*12−12=156). Thus the spectral efficiency for a VoIP packet using RA type 0=352/(156*3) =0.75 b/s/Hz. If we assume a 2 dB implementation loss compared with the ideal Shannon efficiency and 1×2 Single Input Multiple Output (SIMO) transmission to gain 2 dB in receive diversity, this requires a −2.7 dB geometry Signal to Noise and Interference Ratio (SINR). This means that using one RBG to transmit one full VoIP packet would be sufficient in most cases. However, in order to improve the VoIP packet spectral efficiency for high geometry UEs (i.e., UEs seeing low channel interference), the resource allocation needs to be finer than RA type 0 at least for 10 MHz systems.

RA type 1 can allocate bandwidth smaller than a RBG (e.g., 1 PRB). FIG. 1 shows an example of RA type 2 allocations. In FIG. 1, the 50 PRBs are divided into RBGs of 3 PRBs for a total of 17 RBGs (with the last RBG—RBG 16—having 2 PRBs). Each of the 17 RBGs are grouped into three RBG subsets (shown based on their shading in FIG. 1) where each RBG subset consists of every third RBG. The 2 bit RBG subset field of the resource block assignment selects which subset the allocation corresponds to. The bitmap is then 14 bits and represents which of the PRBs within the RBGs are allocated to the mobile. For example, to allocate the second PRB within RBG 1 and the first PRB within RBG 7 (highlighted in FIG. 1), the bitmap would be "01" for the RBG subset to select the second RBG subset (shaded with crosshatches), and "010 000 100 000 000 00" to select the proper PRB. Another bit in the resource block assignment field indicates whether or not to apply an offset (shift) when interpreting the bitmap. Using the same calculations that were done with RA type 0, the corresponding geometries to send a VoIP packet using one PRB or two PRBs with 1×2 SIMO transmission are roughly 5 dB and 0 dB respectively.

Thus it can be appreciated that 10 MHz LTE utilizes 18 bits of resource allocation overhead to allocate resources for one VoIP packet.

For services with small, fixed sized packets (e.g., VoIP), we can reduce the size of the RA field and thus increase spectral efficiency. This is because the current RA types 0 and 1 are designed to be flexible for different types of applications. Thus RA types 0 and 1 are tailored to allow lots of (potentially) non-contiguous PRB allocations spread across multiple RBGs. If we limit the number of PRBs allocated per message to be between one PRB and N PRBs where N may be defined as the maximum number of PRBs that one packet may fit into while still achieving the minimum SINR necessary to decode the packet, we can significantly reduce the amount of signaling overhead as the resource block assignment field may be an index into those more limited combinations of PRBs. In the case of VoIP services, N may be 3 or 4 (N may be different for other services). For example, the assignment field may be an index into a table which may indicate the particular resource blocks allocated. This is distinguishable from the other RA types because the eNodeB may send a code which maps to a position rather than having to send the actual positions, thus saving resources.

In one example, we can limit the number of PRBs allocated per message to be between one and three PRBs and if we further limit allocations of two or three PRBs to be within the same RBG (to avoid resource segmentation caused by small packets), we can greatly reduce the number of bits in the resource block assignment field. In fact, a field of size 7 bits is all that is necessary. This is because there are a total of 50 possibilities for where a single PRB could be allocated, a total of 49 possible combinations for where two PRBs may be allocated (given that both must be within the same RBG), and a total of 16 possible combinations for where three PRBs are allocated (given that all must be in the same RBG) for a total of 115 possibilities (requiring 7 bits to represent 115 different combinations).

Thus for example, if the eNodeB would allocate PRB 43, the resource allocation may be: 0101011 (binary for 43). In this example, the last bit pattern to allocate one PRB may be 0110001. Likewise, for allocations of 2 PRBs within one RBG, there are only a total of 49 possible allocation combinations (3 combinations per RBG except for one combination for the last RBG which only has 2 PRBs) and those 49 possible allocations may be encoded into bit string from 0110010 to 1100010. For example, if the eNodeB would allocate PRBs 0 and 2 within RBG 0, the resource allocation pattern may be 0110100 (52 in decimal). Thus if the resource allocation pattern is between 49 and 98 the UE may determine that it was allocated 2 PRBs. Based on the resource allocation pattern, the UE may determine the RBG in the case that it detects it has been allocated 2 PRB by subtracting 49 and then dividing that number by the number of possible placements of the 2 PRBs within the RBG (three in this case since there are a total of three possible placements: (0,2) (0,1), (1,2)) and subtracting one (as we are indexing from zero). Thus for example, an allocation of: 0110111 is 55 in decimal, subtracting 49 yields 6 and dividing by three possibilities per RBG and subtracting 1 we get a RBG of 1. The PRBs within the RBG can then be determined from the remaining number after subtracting 49 and dividing by the number of possible combinations (in this example 3). The UE may consult a table which shows the possible combinations and the corresponding number. For allocations of 3 PRBs (all within one RBG), then there are a total of only 16 possible combinations and the 16 possible allocations can be encoded into bit string from 1100011 to 1110010. Thus if the resource allocation pattern is between 99 and 114 the UE may determine that it was allocated 3 PRBs. The RBG allocated is determined by subtracting 99 from the resource allocation pattern. Since all PRBs within the RBG are allocated to the mobile, there is no need to calculate the RBG within the PRBs allocated to the mobile.

While in some examples, we limited N to be less than the number of PRBs in a RBG, N may be greater than the number of PRBs in a RBG (e.g., 4 for a 10 mhz system where there are 3 PRBs in a RBG).

While formulas may be used by the UE to calculate the PRB position from the value of the resource block assignment field, in other examples, the UE and/or eNodeB may simply use a lookup table. One skilled in the art with the benefit of Applicants' disclosure will appreciate that different mappings between the allocated PRBs and the indexes sent in the resource block allocation may be used.

Thus in total, as we have 115 possibilities for 1PRB/2PRB/3PRB allocations in one RBG, this requires 7 bits signaling. Generalizing, for other system bandwidths, we can say that the number of bits required is ln(x)/ln(2) rounded up to the nearest whole bit where x is the sum of the number of allocations possible for each allocation size between 1 and N PRBs. Thus for N=3, x=(50 for allocation size 1+49 for allocation size 2+16 for allocation size 3)=115 and thus the number of bits required is 7.

N may be predetermined (e.g., defined in a specification, or signaled to the UE or the eNodeB) and may be selected based upon the service (e.g., VoIP) and/or the network characteristics (e.g., RBG size). For example, N may be determined by the maximum number of PRBs that one packet of the service (e.g., VoIP) fits into and allows for a minimum SINR that would allow the packet to be decoded properly. In some examples N may be smaller than the total system bandwidth (e.g., N is less than the number of PRBs in the system).

While this allocation scheme cannot support allocation of PRBs outside the same RBG, there are a number of options to achieve non-consecutive allocations while still reducing the number of bits used to schedule the resource. For example, additional bits (still less than the original 18) may be introduced to allow signaling one or two additional PRB allocations outside the RBG. In other examples, a specially designed, distributed PRB may be mapped onto multiple PRBs. This may be desirable so as to allow for frequency diversity—mapping certain PRBs across a wider range of available frequencies to limit the impact of interference or other less than ideal channel conditions that may be confined to certain frequency ranges.

The RA signaling overhead can be reduced further to either 2 or 3 bits in other examples. In these examples, the address of the PDCCH may be used to convey part of the resource allocation information. For example, a one to one mapping between the address of the PDCCH and the index of the RBG on which the PDSCH resources are allocated may be used to convey part of the resource allocation information. Thus for example, the RBG of the allocation may be determined by adding an offset to the PDCCH address. The offset to use may be predetermined (e.g., defined in the 3GPP specification), or may be signaled by the UE or the eNodeB (e.g., as part of a system information message broadcast by the eNodeB, or may be signaled as part of the Radio Resource Control "RRC" connection procedures, or the like). The PDCCH address may be determined based upon any number of various methods which will be described later.

Once the one-to-one mapping is determined, the resource block assignment field only needs to convey to the UE which PRB within the RBG (the RBG being determined based upon the offset from the PDCCH) it is allocated. Table 1 shows an example of using 3 bits to indicate various PRB allocations where one RBG contains 3 PRBs. Generalizing to other system bandwidths, the number of bits in the RA field may be the number of PRBs within an RBG.

TABLE 1

Example of using 3 bits to indicate PRB allocations.

| Bit Pattern | PRB index within one RBG containing 3 PRBs |
|---|---|
| 0 0 0 | 0 |
| 0 0 1 | 1 |
| 0 1 0 | 2 |
| 0 1 1 | 0 1 |
| 1 0 0 | 0 2 |
| 1 0 1 | 1 2 |
| 1 1 0 | 0 1 2 |
| 1 1 1 | Reserved |

In yet other examples, if the UE can assume that an ePDCCH of one UE is sent from a particular PRB n within a RBG g, the remaining PRB in that RBG g are always allocated to the same UE's PDSCH, then only two bits are required to signal the PRBs allocated to the UE. Table 2 gives an example of using 2 bits to indicate a PRB assignment of the remaining PRB of the RBG which also contains the ePDCCH. Note that since the ePDCCH does not take up the entire PRB, the PRB on which the ePDCCH is scheduled may be used to transmit the PDSCH as well as the ePDCCH as will be explained later. Generalizing to other system bandwidths, the number of bits necessary to allocate a PRB may be the number of PRBs in a RBG minus 1.

TABLE 2

Example of using 2 bits to indicate 1/2/3 PRB combinations assuming the ePDCCH is sent from PRB 0 in the same RBG.

| Bit Pattern | PRB index within one RBG containing 3 PRBs |
|---|---|
| 0 0 | 0 |
| 0 1 | 0 1 |
| 1 0 | 0 2 |
| 1 1 | 0 1 2 |

The approach in Table 2 using the ePDCCH has some advantages over using the 3 bit approach in table 1. Specifically, since the UE has its ePDCCH and PDSCH in the same PRB, the UE can always use all User Equipment Reference Signals "UERS" in one PRB when decoding the ePDCCH.

Determining the PDCCH Address

As already noted, to use the PDCCH address as an offset to determine the resource allocation, several different options exist for determining the PDCCH address. In a first example, in any given subframe the PDCCH candidate index of aggregation level one may be universally indexed from 0 to 5 and the aggregation level two may be indexed from 6 to 11 and similarly aggregation level four candidates may be indexed as 12 and 13 and aggregation level eight may be indexed as 14 and 15.

In another example option, the starting control channel element (CCE) index may be used as a PDCCH address. This index is already being used to encode the Physical Uplink Control Channel (PUCCH) resource index to send ACK/NACK bits for the PDSCH.

In yet another example option, as discussed above, the ePDCCH and its indicated PDSCH may share the same RBG. Thus no RBG index may be necessary in the DCI. Thus for localized ePDCCH, if the UE's control and data channels (i.e., ePDCCH and PDSCH) are defined to be in the same RBG, then there is no need to specify the RBG index in the control channel (ePDCCH), as the UE simply uses the RBG on which the ePDCCH is located to find the data channel (PDSCH). For distributed ePDCCH, we can use the RBG index where part of the ePDCCH is transmitted as the RBG index of the PDSCH. However, the resource allocation field may still be reduced to 2-3 bits as one distributed ePDCCH may be transmitted over multiple RBGs. However, some RRC signaling may be needed to specify the mapping between the distributed ePDCCH and the RBG of the PDSCH allocation.

For example, if we use a 5 MHz system, we can configure 4 PRBs to transmit the distributed ePDCCHs. In total we can have 16 distributed eCCEs (Enhanced Control Channel Elements). We can group 25 PRBs as 7 VoIP RBGs and each VoIP RBG contains 4 PRBs or equal to 2 RBGs. If we always use one eCCE to transmit the small DCI, we can setup one to one mappings between the eCCE and VoIP RBG. In this case eCCE 0 to 6 are used to schedule VoIP RBG 0 to 6. Thus the UE only needs to decode the small DCI in eCCE 0 to 6. eCCEs 7 to 15 can be used to transmit SPS activate or release when large transmission mode dependent DCI such as DCI 2C are used. For example, eCCE 7 to 15 can be used to send DCI 2C using aggregation 2C. Thus the UE search space needs to contain large aggregation level candidates constructed from those remaining eCCEs. In other examples, the eCCEs 7 to 15 can also be used to transmit the small DCI (with similar one to one mappings as setup for eCCE 0 to 6). Utilizing eCCEs 7 to 15 for small DCI as well may allow multiple re-transmissions to be scheduled on one VoIP RBG.

HARQ Process ID Reduction

Other control signaling overhead savings can be realized by reducing the Hybrid Automatic Repeat Request (HARQ) process ID which is specified in the DCI field from 3 bits to 1 bit. This is because the air interface delay budget is 50 ms, but the VoIP packet periodicity is 20 ms. After 20 ms, a VoIP packet is dropped. Therefore, at most two outstanding VoIP packets are allowed and thus at most two HARQ processes are needed, and because at most two HARQ processes are needed, only one bit is needed to identify a particular HARQ process.

Antenna Ports, SCID, Number of Layers Indication

Even more signaling savings can be realized by removing the antenna port, scrambling identification "SCID", and number of layers indication fields from the DCI field in the scheduling message. These fields may be removed as the eNodeB can always transmit the initial transmission on UERS port 7 and always schedule retransmission of PDSCH on UERS port 8 to enable composite rank 2 Multi-User MIMO (MU-MIMO) between SPS initial transmission and small DCI scheduled retransmission.

MCS, NDI, and RV Reduction for Transport Block 1

For the reduced size DCI, the modulation and coding scheme field (MCS) may be implicitly specified by the number of PRBs allocated. For example, because the transport block size is fixed for small packets (e.g., it can be assumed it is 40 bytes for VoIP packets) and because the number of resource blocks assigned is known, the MCS may be calculated by the UE without further signaling. Thus the MCS field is not needed. Furthermore, the new data indicator (NDI) is not needed because the initial transmission is always using SPS allocation. Additionally, if only chase combining is used for these transmissions, the redundancy version (RV) bits may not be utilized. In total, we can save 8 bits by removing redundant fields.

For example, for rank 1 transmission, the transmission formats would be:
1. 1PRB/64QAM
2. 2PRB/16QAM
3. 3PRB/QPSK If rank 2 transmissions are utilized, the following transmission formats are used:
1. 1PRB/16QAM
2. 2PRB/QPSK Note that the transport block size may be fixed to be 328 bits.

MCS, NDI, and RV Reduction for Transport Block 2

For the reduced DCI, it can be assumed that there is no second transport block. Even if rank 2 transmission is allowed for VoIP transmission, only one transport block is used.

Small DCI Summary

In sum, a comparison of the standard DCI field and the small DCI field in the downlink assignment message is shown in Table 3.

| Field Name | DCI 2C (bits) | VoIP DCI (bits) |
| --- | --- | --- |
| Carrier Indicator | 0 or 3 | 0 |
| RA header | 1 | 0 |
| RB assignment | 17 | 2-3 |
| TPC for PUCCH | 2 | 2 |
| DAI for TDD | 2 | 2 |
| HARQ process # | 3 for FDD, 4 for TDD | 1 |
| Antenna ports, SC ID and layers | 3 | 0 |
| SRS request for TDD | 0-1 | 0-1 |
| MCS, NDI, RV | 16 | 0 |
| CRC | 16 | 16 |
| Total | 58 | 21 |

To summarize, if one ePDCCH is transmitted using aggregation level one in one PRB and one PRB contains four eCCEs, one eCCE contains roughly 36 resource elements "RE"s. The operating SINR for this small DCI will be roughly −4 dB. Thus even with one e-CCE, the ePDCCH can still be sufficiently reliable. In most cases, the ePDCCH plus a VoIP packet can be nicely fit into a PRB using the small DCI. Therefore the capacity of VoIP can be increased greatly.

In some other examples, it may be possible to decrease the number of CRC bits and further shorten the control signaling. For example, using masking with a shortened C-RNTIs or by applying sequence modulation for the small DCIs. In these examples each UE will only demodulate the sequences from a few candidate sequences.

Additionally, because the small DCI is only able to schedule a limited number of PRBs, the eNodeB can send multiple small DCIs for the same UE in the same subframe. For example, the eNodeB can send HARQID=0 in RBG 0 and HARQID=1 in RBG 3 in the same subframe for the same UE. In other examples, the same HARQID may be sent multiple times in the same subframe to increase VoIP capacity and to aid in the quick retransmission of missed VoIP frames.

Figure 2:
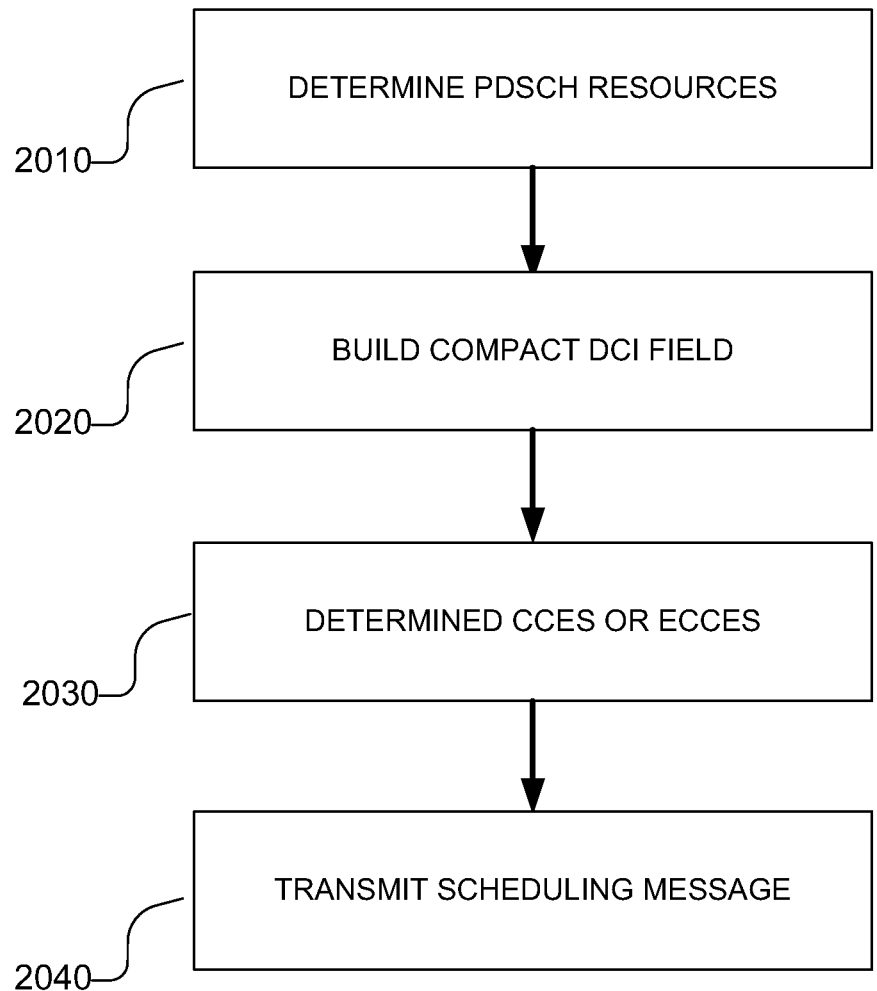
FIG. 2 shows a flowchart of a method for building a compact scheduling message according to some examples of the present disclosure.

FIG. 2 describes a method according to some examples of the present disclosure for building a small scheduling message. At operation 2010 the eNodeB determines the downlink shared channel resources which are to be allocated to the particular UE. As previously described, in some examples, these resources may be in the same RBG as an ePDDCH allocated to the same UE. At operation 2020, the eNodeB builds the small DCI field of the small scheduling assignment message as previously described. At operation 2030, the eNodeB may determine which CCEs or eCCEs to transmit the small scheduling message. At operation 2040, the eNodeB transmits the scheduling message on the determined CCEs or eCCEs as appropriate.

Figure 3:
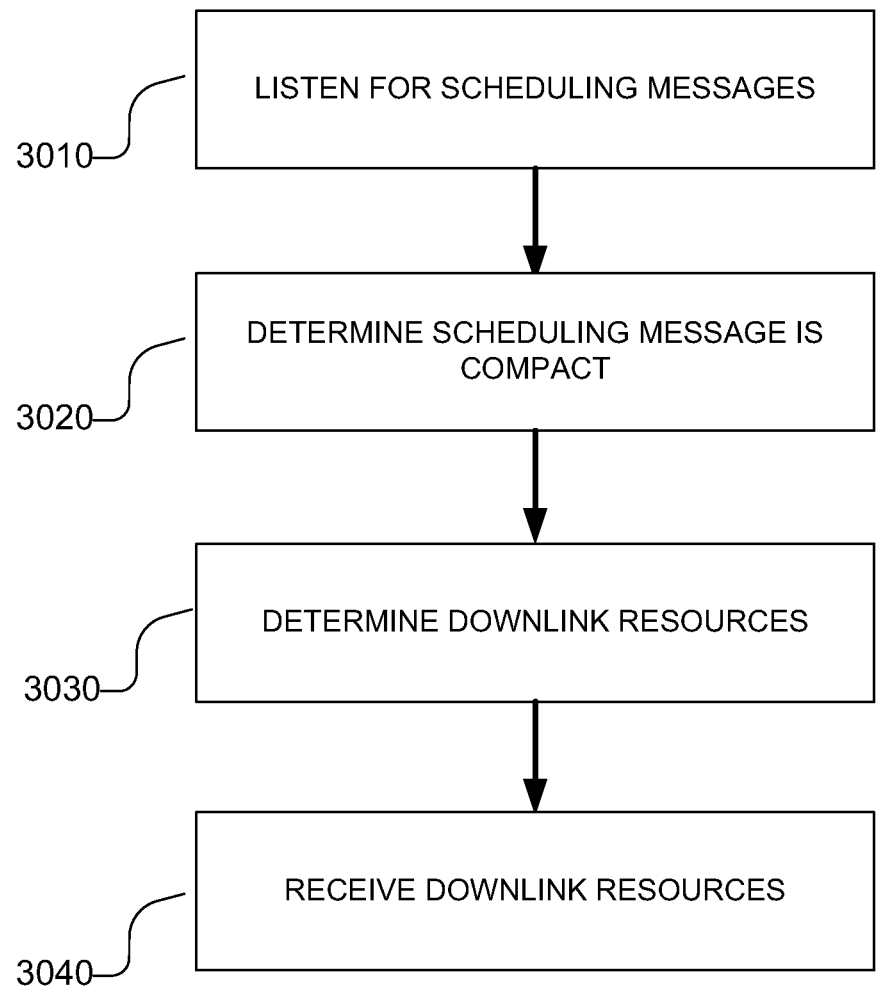
FIG. 3 shows a flowchart of a user equipment (UE) processing a compact scheduling message according to some examples of the present disclosure.

FIG. 3 describes a method according to some examples of the present disclosure for receiving a small scheduling message and for utilizing its contents. At operation 3010 the UE listens for scheduling messages on the PDCCH or ePDDCH at the appropriate search spaces and aggregation levels (which may be determined in some examples based on the current frame number and/or the mobile identity). At operation 3020, upon decoding a scheduling message, the UE determines that it is a small scheduling message. At operation 3030, the mobile determines which downlink resources are assigned to the UE (based upon either the small RA field). At operation 3040, the UE may receive one or more packets in the downlink resources which were scheduled by the eNodeB and signaled as part of the small assignment message.

Multiplexing the PDSCH and the ePDCCH

Enhanced PDCCH (ePDCCH) was introduced in LTE Rel. 11 systems. Compared to PDCCH defined in LTE Rel. 8 systems, the major differences in ePDCCH are:

1) PDCCH time division multiplexes (TDM) with PDSCH in OFDM symbol granularity. For example, the PDCCH always occupies the first N OFDM symbols of one subframe, where N can be 1, 2, 3, or 4. In contrast, ePDCCH frequency division multiplexes (FDM) with the PDSCH in PRB granularity. For example, the ePDCCH may occupy M PRBs of one subframe, where M is greater than 0 and less than full system bandwidth.

2) PDCCH relies on common reference signal (CRS) for coherent demodulation while the ePDCCH relies on UE-specific reference signal (UERS) for coherent demodulation.

3) PDCCH is mapped in the whole control region in a distributed manner while the ePDCCH supports both localized mapping into contiguous PRBs or distributed mapping into distributed PRBs.

4) The inter-cell orthogonality of PDCCH can't be guaranteed because of the random mapping while the inter-cell orthogonality of ePDCCH can guaranteed.

Whether ePDCCH can be multiplexed with the same UE's PDSCH in the same PRB has not been determined by the 3GPP yet, and even if it is allowed, the exact method to multiplex ePDCCH with PDSC in the same PRB has yet to be determined.

Several application scenarios exist for ePDCCH/PDSCH coexisting in the same PRB:

First, for small system bandwidth systems, this can save bandwidth and eliminate waste. For example if a system has only 6 PRB and two PRBs are reserved to transmit the ePDCCH, the eNB often uses TDM scheduling to schedule one UE in one subframe. If the multiplexing of ePDCCH/PDSCH is not allowed in one PRB, then unused REs in the PRB which contains the ePDCCH are always wasted. Since the system bandwidth is small, the resource waste could be large, e.g. more than 10%.

Second, for highly selective channels, the multiplexing scheme may be designed to improve performance for these channels to ensure robust channel estimation performance for the data region. To accomplish this, if we allow ePDCCH/PDSCH to coexist in the same PRB and design the multiplexing pattern properly, we can use the decoded ePDCCH as additional channel training signals for those PDSCH REs in the same PRB. As a result, the decoding performance of those PDSCH REs will be improved greatly in these fast fading and frequency selective channels (e.g., a high speed channel).

Figure 7:
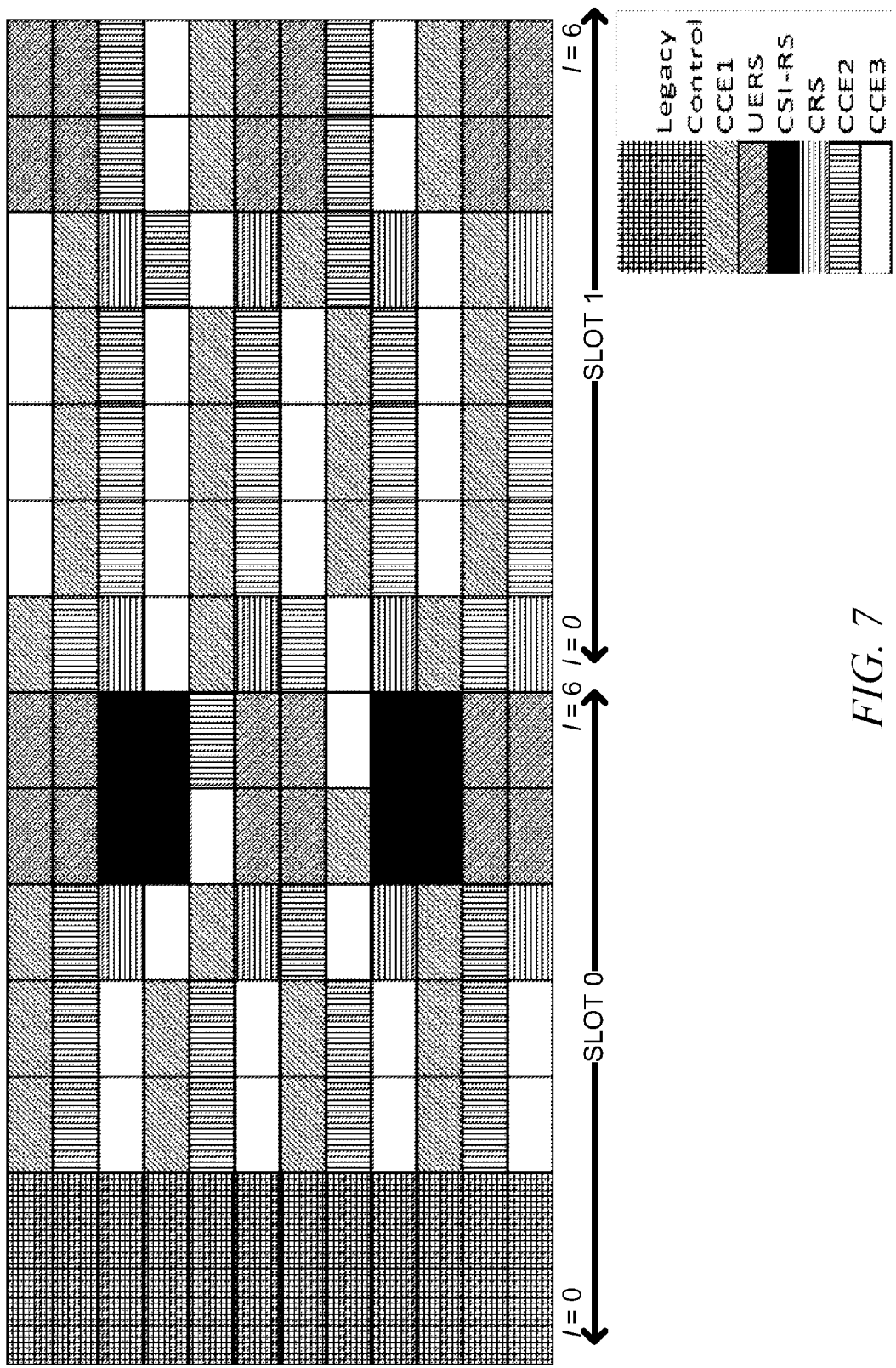
FIG. 7 shows an example of multiplexing an enhanced physical downlink control channel (e-PDCCH) and a physical downlink shared channel (PDSCH) according to some examples of the present disclosure.

Several options, such as TDM, FDM (Frequency Division Multiplexing), and TDFDM (Time Division and Frequency Division Multiplexing) may be used to multiplex together the PDSCH/ePDCCH in one PRB. FIG. 7 gives one example of how multiple CCEs may be interleaved in one PRB so as to allow for using the ePDCCH as additional channel training signals. The interleaving of FIG. 7 can be viewed as a special example of TDFDM. When one PRB sends only one DCI using one CCE, the remaining REs of the PRB are used for PDSCH to send data traffic. If the PDSCH REs are for the same UE as the DCI, the decoded DCI can be used as a training pilot to demodulate those PDSCH REs. Though the decoding procedure is UE implementation related, it can be standardized in 3GPP by defining increased decoding requirement for high speed scenarios.

Example Wireless Network

Figure 4:
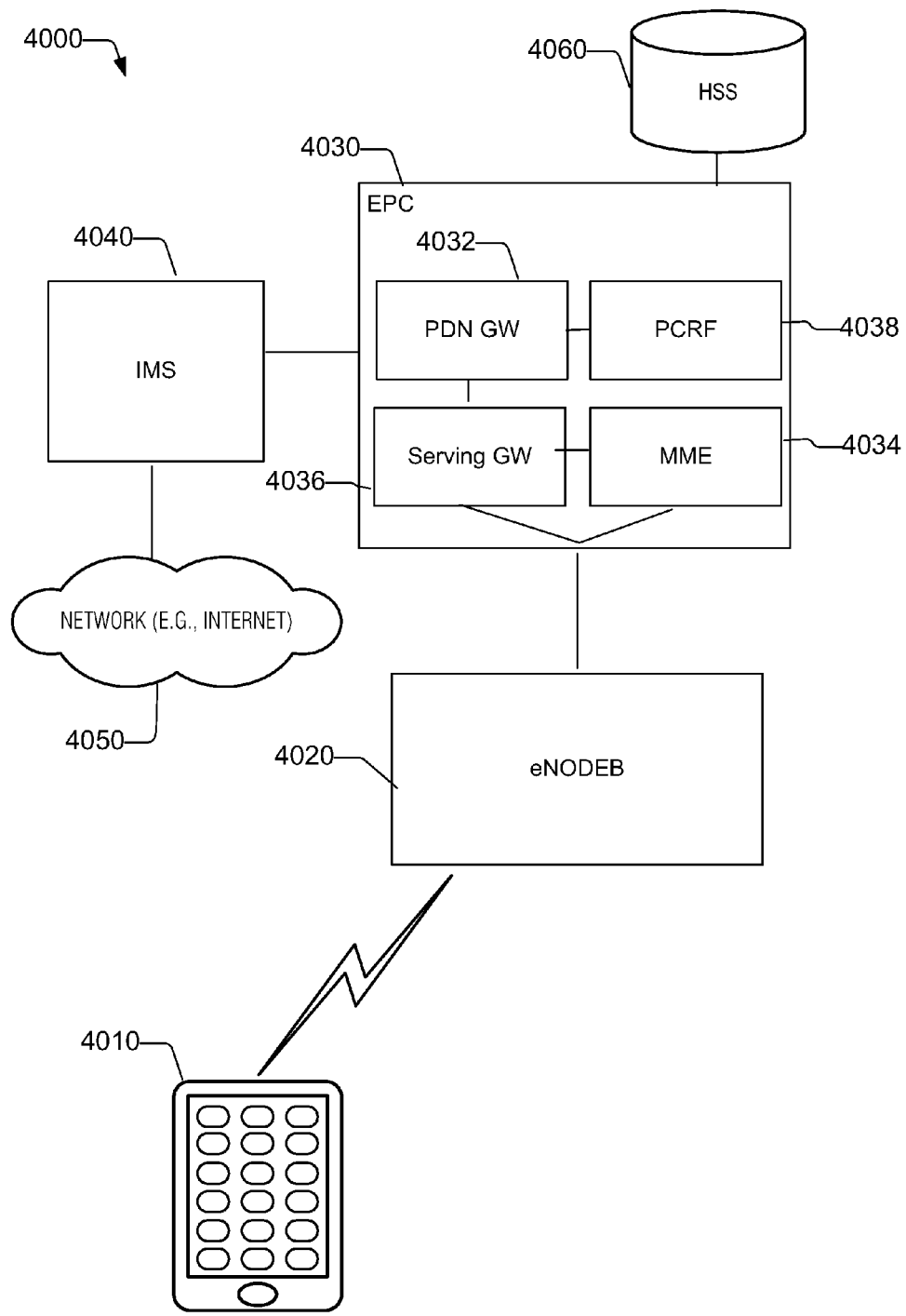
FIG. 4 shows an example long term evolution (LTE) system according to some examples of the present disclosure.

FIG. 4 shows a schematic of a wireless network implemented in accordance with a Long Term Evolution (LTE) family of standards according to some examples. One or more mobile devices or user equipments (UEs) (e.g., such as UE 4010) communicate with one or more eNodeBs (e.g., such as eNodeB 4020) over one or more radio frequency interfaces. The eNodeBs support Layer 1 (an Orthogonal Frequency Division Multiplexing (OFDM) physical layer), Layer 2 (Medium Access Control, Radio Link Control, Packet Data Convergence Protocol), and Layer 3 (Radio Resource Control—RRC) protocols used to provide for data transmission between the UEs, the eNodeBs and other networks. These protocols provide functions including modulation/demodulation, channel coding/decoding, radio resource control, radio mobility management, and other functions. The eNodeB 4020 may be further connected over an Si interface to an Evolved Packet Core (EPC) 4030 comprised of one or more Mobility Management Entities (MME) 4034, serving gateways (SGW) 4036, and the Packet Data Network gateways 4032. The EPC may also have other components (not shown) including components for setting policies and for billing, as well as components utilized to enable voice calling. MME 4034 controls the control plane functions related to subscriber and session management. Serving Gateway 4036 serves as a mobility anchor which routes packets from mobiles for mobility within the network 4000. The PDN gateway 4032 is the termination point of the packet data interface towards the Packet Data Network. The PDN gateway 4032 may be connected to an Internet Protocol Multimedia Subsystem (IMS) 4040 which may provide access to one or more public networks, such as the Internet, 4050. Policy and Charging Rules Function (PCRF) component 4038 manages QoS information, and other system policies. Home Subscriber Server (HSS) 4060 maintains and manages user identification and addressing, user profile information, authentication of users, ciphering and integrity protection, and other functions. HSS 4060 is shown as separate from EPC 4030, but in other examples it may be part of the EPC 4030. The various components of network 4000 may be or include various components of machine 6000 (see FIG. 6) or additional components such as RF transceivers/receivers, amplifiers, or the like.

Figure 5:
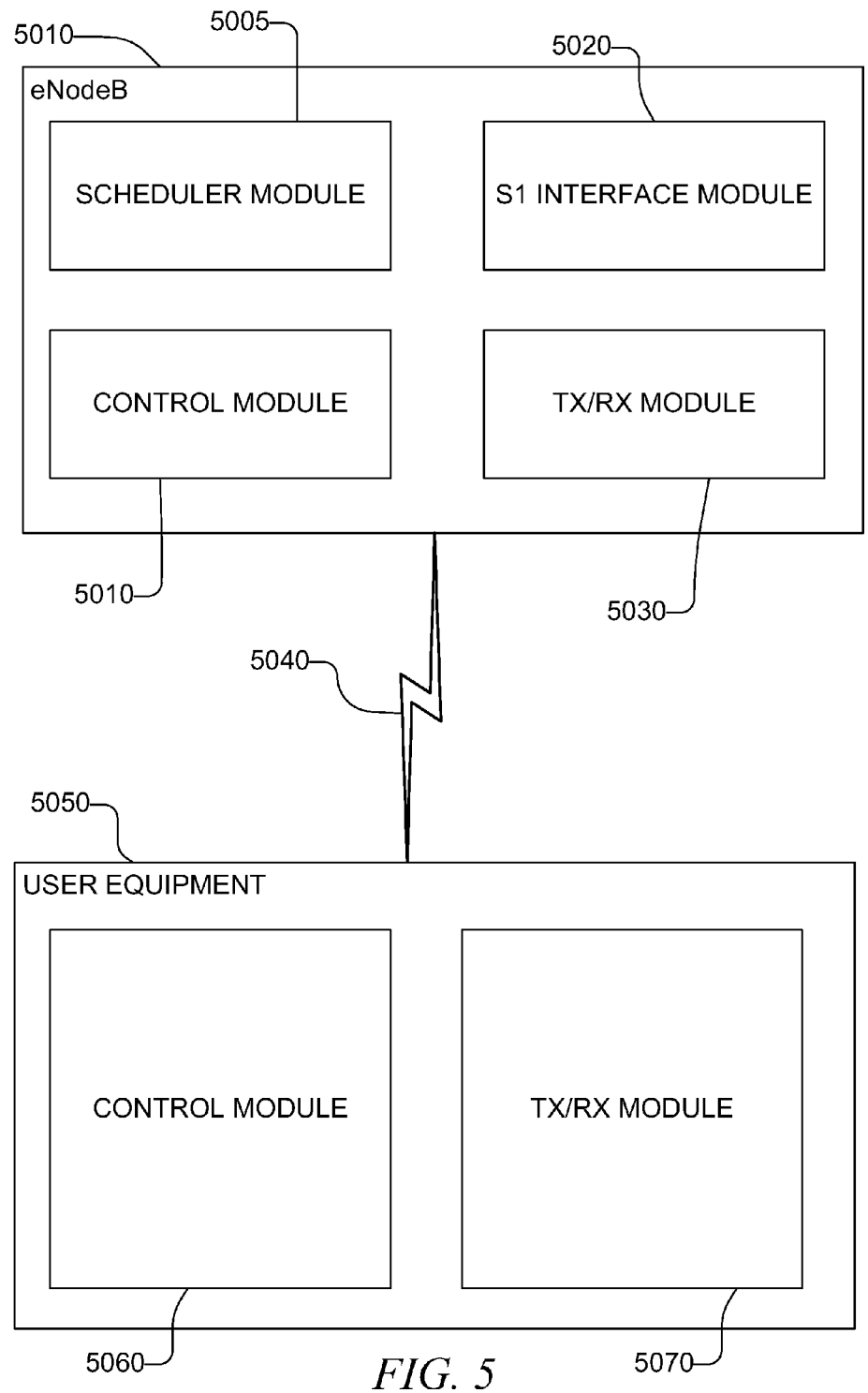
FIG. 5 shows a block diagram of an eNodeB and a UE according to some examples of the present disclosure.

FIG. 5 shows an example schematic diagram of an eNodeB 5010 and a User Equipment 5050. The eNodeB may include (among other modules) a scheduler module 5005 used to schedule transmissions on the PDCCH, the PDSCH, and other control and data channels. The eNodeB may also include a control module 5010 which may handle L2 and L3 functionality. In some examples the scheduler may be integrated with the control module 5010. The eNodeB may also include an s1 interface module 5020 for sending/receiving data from the EPC. The eNodeB may also include a TX/RX module which may implement the LTE physical layer functions including modulation, coding, transmission, reception, demodulation and unencoding. Data may be transmitted over an RF interface 5040 with UE 5050. UE 5050 may have a TX/RX module 5070 which may implement the LTE physical layer functions including modulation, coding, transmission, reception, demodulation and unencoding. The UE may also have a control module 5060 which may implement other layers of the LTE protocol stack (e.g., Layer 2 and Layer 3). For example, the control module 5060 may receive, decode, and interpret the scheduling messages sent on the PDCCH which schedule the UE on the PDSCH and the PUCCH. In response to this information the control module may instruct the TX/RX module to receive and decode PRBs scheduled to this UE. The control module 5060 may also determine which DCI (e.g., small or regular) is used. In some examples the control module 5060 may be integrated in whole or in part with the TX/RX module 5070.

Figure 6:
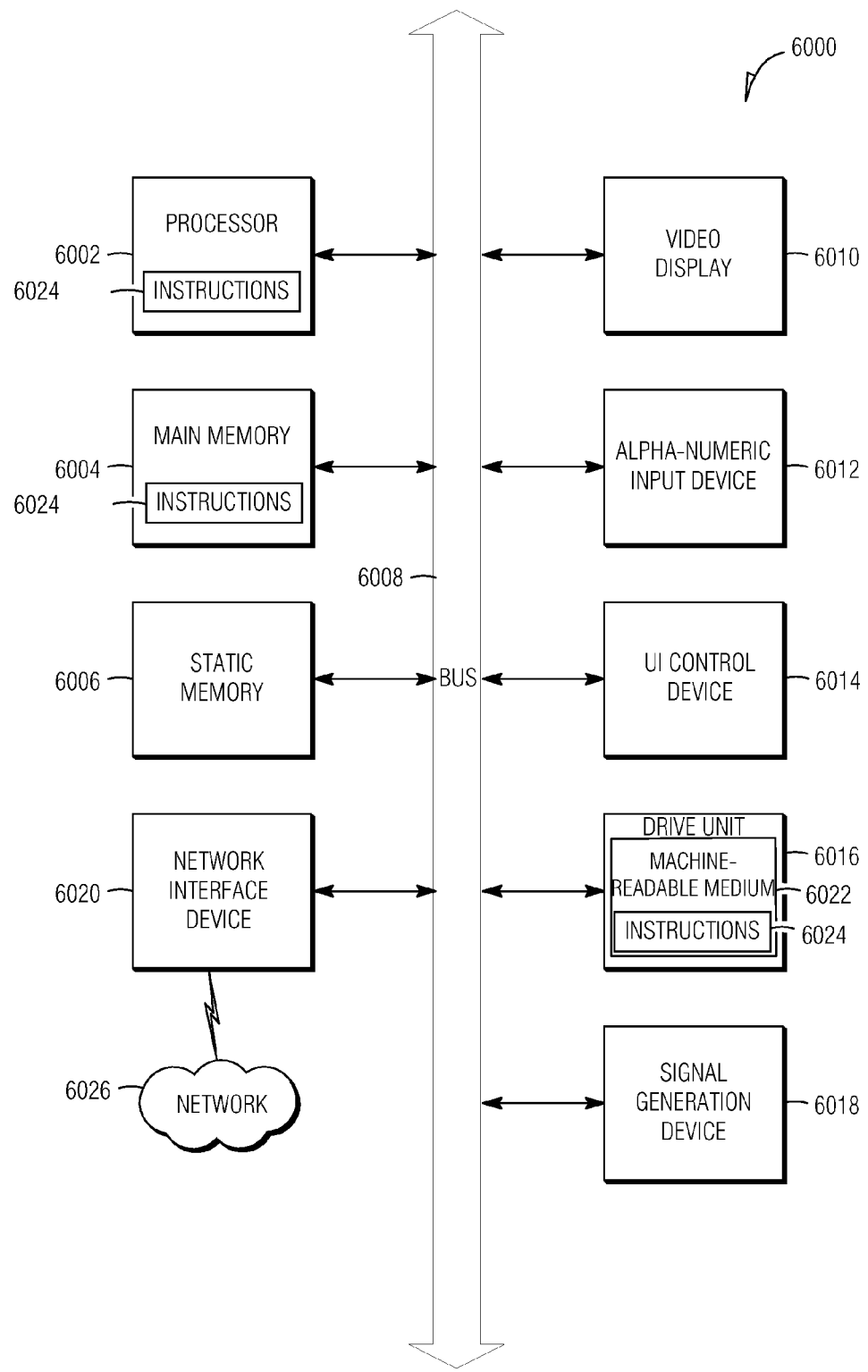
FIG. 6 shows a schematic of a machine according to some examples of the present disclosure.

FIG. 6 illustrates a block diagram of an example machine 6000 upon which any one or more of the techniques (e.g., methodologies) discussed herein can be performed. In alternative embodiments, the machine 6000 can operate as a standalone device or can be connected (e.g., networked) to other machines. In a networked deployment, the machine 6000 can operate in the capacity of a server machine, a client machine, or both in server-client network environments. In an example, the machine 6000 can act as a peer machine in peer-to-peer (P2P) (or other distributed) network environment. The machine 6000 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. For example, an eNodeB, a UE, or other components of an LTE system may be, or include components of, machine 6000. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 6000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time.

Machine (e.g., computer system) 6000 can include a hardware processor 6002 (e.g., a central processing unit (CPU), a graphics processing unit (GPU), a hardware processor core, or any combination thereof), a main memory 6004 and a static memory 6006, some or all of which can communicate with each other via a bus 6008. The machine 6000 can further include a display unit 6010, an alphanumeric input device 6012 (e.g., a keyboard), a user interface (UI) control device 6014, and/or other input devices. In an example, the display unit 6010 and UI control device 6014 can be a touch screen display. The machine 6000 can additionally include a storage device (e.g., drive unit) 6016, a signal generation device 6018 (e.g., a speaker), and a network interface device 6020.

The storage device 6016 can include a machine-readable medium 6022 on which is stored one or more sets of data structures or instructions 6024 (e.g., software) embodying or utilized by any one or more of the techniques or functions described herein. The instructions 6024 can also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 can constitute machine readable media.

While the machine-readable medium 6022 is illustrated as a single medium, the term "machine readable medium" can include a single medium or multiple media (e.g., a centralized or distributed database, and/or associated caches and servers) that configured to store the one or more instructions 6024.

The term "machine-readable medium" can include any tangible medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 6024 can further be transmitted or received over a communications network 6026 using a transmission medium via the network interface device 6020. Network interface device 6020 may connect the machine 6000 to a network of other machines in order to communicate with the other machines in the network by utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 6020 can include one or more physical jacks (e.g., Ethernet, coaxial, or phone jacks) or one or more antennas to connect to the communications network 6026. In an example, and as shown in FIG. 6, the network interface device 6020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 6000, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

OTHER EXAMPLES

Example 1

A method of wireless resource block assignment in a long term evolution wireless network including creating a downlink control information message for a user equipment, the downlink control information message comprising: a resource block assignment field which indicates up to N physical resource blocks scheduled to the user equipment by specifying an index into a plurality of all possible physical resource block allocations of between 1 and N resource blocks, wherein the resource block assignment field comprises at most a number of bits necessary to address all of the possible physical resource block allocations for assignments of 1 to N physical resource blocks, and wherein N is less than a total number of physical resource blocks; and sending the downlink control information over a physical downlink control channel using orthogonal frequency division multiplexing.

Example 2

The method of example 1, comprising sending a voice-over-internet-protocol packet to the user equipment on the up to N physical resource blocks allocated to the user equipment.

Example 3

The method of any of examples 1-2, wherein the size of the resource block assignment field is at most a number of bits equal to the size of a physical resource block group, the resource block assignment field specifying the up to N physical resource blocks allocated to the user equipment with reference to an address of the physical downlink control channel.

Example 4

The method of any one of examples 1-2, wherein the size of the resource block assignment field which is at most a number of bits equal to the size of a physical resource block group–1, the resource block assignment field specifying the up to N physical resource blocks allocated to the user equipment with reference to an address of an enhanced physical downlink control channel wherein the enhanced physical downlink control channel is sent from a first physical resource block in a common resource block group.

Example 5

The method of any one of examples 1-4, wherein N is signaled as part of an RRC message sent to the user equipment.

Example 6

The method of any one of examples 1-5, wherein the downlink control information message does not contain information on one of: scrambling identification, antenna ports, and number of layers.

Example 7

The method of any one of examples 1-6 wherein the downlink control information message does not contain information on one of: modulation and coding scheme indication, a new data indication, and a redundancy version indication.

Example 8

An eNodeB with a scheduler module configured to: create a downlink control information message for a user equipment, the downlink control information message assigning to the user equipment up to N scheduled physical resource blocks by specifying an index into a plurality of all possible physical resource block allocations of between 1 and N resource blocks, all allocated to the same resource block group, and wherein N is less than a total number of resource blocks and a transceiver configured to send the scheduling message on the determined control channel element.

Example 9

The eNodeB of example 8, wherein a communication mode between the eNodeB and the user equipment is a transmission mode nine.

Example 10

The eNodeB of any one of examples 8-9, wherein N is determined based upon a minimum signal to interference and noise ratio which is necessary to decode a packet which is to be transmitted on the up to N physical resource blocks.

Example 11

The eNodeB of any one of examples 8-10, wherein the scheduler is configured to schedule two non-consecutive physical resource blocks within the same resource block group.

Example 12

The eNodeB of any one of examples 8-11, wherein the downlink control information specifies the up to N physical resource blocks allocated to the user equipment with reference to the address of a physical downlink control channel.

Example 13

The eNodeB of any one of examples 8-11, wherein the downlink control information specifies the up to N physical resource blocks allocated to the user equipment with reference to the address of an enhanced Physical Downlink Control Channel.

Example 14

A user-equipment with a receive module configured to: receive a resource block assignment message from an eNodeB on a Physical Downlink Control Channel; determine that the resource block assignment message is a small resource block assignment message, the small resource block assignment message containing a resource block assignment field, the resource block assignment field specifying up to N physical resource blocks on a physical downlink shared channel which are allocated to the UE, and wherein the resource block assignment field is an index into a plurality of all possible physical resource block allocations of between 1 and N resource blocks, wherein N is less than a total number of physical resource blocks; determining the one or more physical resource blocks on the Physical Downlink Control Channel which are assigned to the user-equipment based upon the resource block assignment field; and decode data sent by the eNodeB on the one or more physical resource blocks.

Example 15

The user equipment of example 14, wherein the data transmitted on the up to N physical resource blocks allocated to the user equipment comprises voice-over-internet-protocol packets.

Example 16

The user equipment of any one of examples 14-15, wherein the receive module is configured to receive a User Equipment Specific Reference Signal and a Channel State Information Reference Signal.

Example 17

The user equipment of any one of examples 14-16, wherein the size of the resource block assignment field is at most a number of bits equal to the number of physical resource blocks in a resource block group, the resource block assignment field specifying the up to N physical resource blocks allocated to the user equipment with reference to the address of the Physical Downlink Control Channel.

Example 18

The user equipment of any one of examples 14-16, wherein the size of the resource block assignment field is at most a number of bits equal to the number of physical resource blocks in a resource block group−1, the resource block assignment field specifying the up to N physical resource blocks allocated to the user equipment with reference to the address of an enhanced Physical Downlink Control Channel.

Example 19

The user equipment of any one of examples 14-18, wherein the downlink control information message comprises a hybrid automatic repeat request (HARQ) process identification field with at most 1 bit.

Example 20

The user equipment of any one of examples 14-19, wherein the downlink control information message does not contain information on one of: scrambling identification, antenna ports, and number of layers.

Example 21

The user equipment of any one of examples 14-20, wherein the downlink control information message does not contain information on one of: modulation and coding scheme, new data indicator, and redundancy version.

Example 22

A machine readable medium that stores instructions which when performed by a machine, cause the machine to perform operations of: creating a downlink control information message for a user equipment, the downlink control information message comprising: a resource block assignment field which indicates up to N physical resource blocks scheduled to the user equipment by specifying an index into a plurality of all possible physical resource block allocations of between 1 and N resource blocks, wherein the resource block assignment field comprises at most a number of bits necessary to address all of the possible physical resource block allocations for assignments of 1 to N physical resource blocks, and wherein N is less than a total number of physical resource blocks; and sending the downlink control information over a physical downlink control channel using orthogonal frequency division multiplexing.

Example 23

The machine-readable medium of example 22, wherein the instructions include instructions which when performed by the machine, cause the machine to perform operations comprising: sending a voice-over-internet-protocol packet to the user equipment on the up to N physical resource blocks allocated to the user equipment.

Example 24

The machine-readable medium of any one of examples 22-23, wherein the size of the resource block assignment field is at most a number of bits equal to the size of a physical resource block group, the resource block assignment field specifying the up to N physical resource blocks allocated to the user equipment with reference to an address of the physical downlink control channel.

Example 25

The machine-readable medium of any one of examples 22-23, wherein the size of the resource block assignment field which is at most a number of bits equal to the size of a physical resource block group−1, the resource block assignment field specifying the up to N physical resource blocks allocated to the user equipment with reference to an address of an enhanced physical downlink control channel wherein the enhanced physical downlink control channel is sent from a first physical resource block in a common resource block group.

Example 26

The machine-readable medium of any one of examples 22-25, wherein N is signaled as part of an RRC message sent to the user equipment.

Example 27

The machine-readable medium of any one of examples 22-26, wherein the downlink control information message does not contain information on one of: scrambling identification, antenna ports, and number of layers.

Example 28

The machine-readable medium of any one of examples 22-26, wherein the downlink control information message does not contain information on one of: modulation and coding scheme indication, a new data indication, and a redundancy version indication.

What is claimed is:

1. A method of wireless resource block assignment in a long term evolution wireless network comprising:
   creating a downlink control information message for a user equipment, the downlink control information message comprising:
   a resource block assignment field which indicates up to a maximum number of allocated physical resource blocks scheduled to the user equipment by specifying an index into a plurality of all possible physical resource block allocations of between 1 and the maximum number of allocated physical resource blocks, wherein the resource block assignment field comprises at most a number of bits necessary to address all of the possible physical resource block allocations for assignments of 1 to the maximum number of allocated physical resource blocks of physical resource block groups in a plurality of physical resource block groups, and wherein the maximum number of allocated physical resource blocks is an integer greater than 0 and less than a total number of physical resource blocks; and
   sending the downlink control information over a physical downlink control channel using orthogonal frequency division multiplexing.

2. The method of claim 1, comprising sending a voice-over-internet-protocol packet to the user equipment on physical resource blocks allocated to the user equipment.

3. The method of claim 1, wherein the resource block assignment field specifies the up to the maximum number of allocated physical resource blocks allocated to the user equipment with reference to an address of the physical downlink control channel.

4. The method of claim 1, wherein the resource block assignment field specifies the up to the maximum number of allocated physical resource blocks allocated to the user equipment with reference to an address of an enhanced physical downlink control channel wherein the enhanced physical downlink control channel is sent from a first physical resource block in a common resource block group.

5. The method of claim 1, wherein the maximum number of allocated physical resource blocks is signaled as part of an RRC message sent to the user equipment.

6. The method of claim 1, wherein the downlink control information message does not contain information on one of: scrambling identification, antenna ports, and number of layers.

7. The method of claim 1, wherein the downlink control information message does not contain information on one of: modulation and coding scheme indication, a new data indication, and a redundancy version indication.

8. An eNodeB comprising:
a scheduler module configured to:
create a downlink control information message for a user equipment, the downlink control information message assigning to the user equipment up to a maximum number of scheduled physical resource blocks by specifying an index into a plurality of all possible physical resource block allocations of between 1 and the maximum number of the scheduled physical resource blocks, all allocated to the same resource block group, and wherein the maximum number of scheduled physical resource blocks is an integer greater than 0 and less than a total number of resource blocks, and wherein the index comprises at most a number of bits necessary to address the plurality of all possible physical resource block allocations of between 1 and the maximum number of scheduled physical resource blocks of physical resource block groups in a plurality of physical resource block groups; and
a transceiver configured to send the scheduling message on the determined control channel element.

9. The eNodeB of claim 8, wherein a communication mode between the eNodeB and the user equipment is a transmission mode nine.

10. The eNodeB of claim 8, wherein the maximum number of scheduled physical resource blocks is determined based upon a minimum signal to interference and noise ratio which is necessary to decode a packet which is to be transmitted on the up to the maximum number of scheduled physical resource blocks.

11. The eNodeB of claim 8, wherein the scheduler is configured to schedule two non-consecutive physical resource blocks within the same resource block group.

12. The eNodeB of claim 8, wherein the downlink control information specifies the up to the maximum number of scheduled physical resource blocks allocated to the user equipment with reference to the address of a physical downlink control channel.

13. The eNodeB of claim 8, wherein the downlink control information specifies the up to the maximum number of scheduled physical resource blocks allocated to the user equipment with reference to the address of an enhanced Physical Downlink Control Channel.

14. A non-transitory machine readable medium that stores instructions which when performed by a machine, cause the machine to perform operations comprising:
creating a downlink control information message for a user equipment, the downlink control information message comprising:
a resource block assignment field which indicates up to a maximum number of allocated physical resource blocks scheduled to the user equipment by specifying an index into a plurality of all possible physical resource block allocations of between 1 and the maximum number of allocated physical resource blocks, wherein the resource block assignment field comprises at most a number of bits necessary to address all of the possible physical resource block allocations for assignments of 1 to the maximum number of allocated physical resource blocks of physical resource block groups in a plurality of physical resource block groups, and wherein the maximum number of allocated physical resource blocks is an integer greater than 0 and less than a total number of physical resource blocks; and
sending the downlink control information over a physical downlink control channel using orthogonal frequency division multiplexing.

15. The machine-readable medium of claim 14, wherein the instructions include instructions which when performed by the machine, cause the machine to perform operations comprising: sending a voice-over-internet-protocol packet to the user equipment on physical resource blocks allocated to the user equipment.

16. The machine-readable medium of claim 14, wherein the resource block assignment field specifies the up to the maximum number of allocated physical resource blocks allocated to the user equipment with reference to an address of the physical downlink control channel.

17. The machine-readable medium of claim 14, the resource block assignment field specifies the up to the maximum number of allocated physical resource blocks allocated to the user equipment with reference to an address of an enhanced physical downlink control channel wherein the enhanced physical downlink control channel is sent from a first physical resource block in a common resource block group.

18. The machine-readable medium of claim 14, wherein the maximum number of allocated physical resource blocks is signaled as part of an RRC message sent to the user equipment.

19. The machine-readable medium of claim 14, wherein the downlink control information message does not contain information on one of: scrambling identification, antenna ports, and number of layers.

20. The machine-readable medium of claim 14, wherein the downlink control information message does not contain information on one of: modulation and coding scheme indication, a new data indication, and a redundancy version indication.

* * * * *